(12) United States Patent
Vaya et al.

(10) Patent No.: US 9,208,380 B2
(45) Date of Patent: Dec. 8, 2015

(54) METHODS AND SYSTEMS FOR RECOGNIZING HANDWRITING IN HANDWRITTEN DOCUMENTS (71) Applicant: Xerox Corporation, Norwalk, CT (US)

(72) Inventors: Shailesh Vaya, Bangalore (IN); Akshayaram Srinivasan, Tamil Nadu (IN); Sai Praneeth Reddy K, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 162 days.

(21) Appl. No.: 14/083,560

(22) Filed: Nov. 19, 2013

(65) Prior Publication Data

US 2015/0139548 A1    May 21, 2015

(51) Int. Cl.
*G06K 9/00* (2006.01)
*G06Q 10/06* (2012.01)
*G06K 9/62* (2006.01)

(52) U.S. Cl.
CPC ........ *G06K 9/00456* (2013.01); *G06K 9/6264* (2013.01); *G06K 9/6292* (2013.01); *G06Q 10/063112* (2013.01)

(58) Field of Classification Search
None
See application file for complete search history.

(56) References Cited

U.S. PATENT DOCUMENTS

2015/0088884 A1* 3/2015 Shah ............................. 707/737

OTHER PUBLICATIONS

Wauthier, Fabian L., Nebojsa Jojic, and Michael I. Jordan. Active spectral clustering via iterative uncertainty reduction., Proceedings of the 18th ACM SIGKDD international conference on Knowledge discovery and data mining. ACM, 2012.
Vuori, Vuokko. Clustering writing styles with a self-organizing map., Frontiers in Handwriting Recognition, 2002. Proceedings. Eighth International Workshop on. IEEE, 2002.
Louis Vuurpijl, Lambert Schomaker. Coarse writing style clustering based on simple stroke-related features, Progress in Handwriting Recognition (1996): 37-44.
Vassilis Papavassilioua, Themos Stafylakisa, Vassilis Katsourosa and George Carayannisa. A Handwritten document image segmentation into lines and words, Pattern Recognition 43(2010)369-377.
Bense_a, Ameur, Thierry Paquet, and Laurent Heutte. Information retrieval based writer identi_cation., Proceedings of the seventh international conference on document analysis and recognition. vol. 2. 2003.
David Cheng, Ravi Kannan, Santosh Vempala, Grant Wang On a Recursive Spectral Algorithm for Clustering from Pairwise Similarities, Computer Methods in Applied Mechanics and Engineering, vol. 121, Issues 14, Mar. 1995, pp. 137162.

(Continued)

*Primary Examiner* — Sumati Lefkowitz
*Assistant Examiner* — David Perlman (57) ABSTRACT

The disclosed embodiments illustrate a method for comparing handwriting in a first electronic document and a second electronic document. The method includes extracting, by one or more processors, one or more segments from a first electronic document and a second electronic document. Each of the one or more segments includes a handwritten text. Thereafter, one or more sets of segments are created from the one or more segments. An information indicating categorization of each segment in a set of segments in one or more categories is received. The information is provided by one or more workers based on the handwriting in each segment. A similarity score based on a count of segments in each of the one or more categories is determined. The similarity score is deterministic of a degree of similarity between the first electronic document and the second electronic document.

21 Claims, 6 Drawing Sheets

(56) References Cited

OTHER PUBLICATIONS

Kannan, R.; Vempala, S.; Veta, A. On Clusterings: Good, Bad and Spectral, Foundations of Computer Science, 2000. Proceedings. 41$^{st}$ Annual Symposium on , vol., no., pp. 367,377, 2000.

Arazy, Ofer, Morgan, Wayne and Patterson, Raymond Wisdom of the Crowds: Decentralized Knowledge Construction in Wikipedia. 16th Annual Workshop on Information Technologies and Systems (WITS) Paper(Dec. 8, 2006).

Siddiqi, Imran Ahmed, and Nicole Vincent. Writer identi_cation in handwritten documents., Document Analysis and Recognition, 2007. ICDAR 2007. Ninth International Conference on. vol. 1. IEEE, 2007.

\* cited by examiner

METHODS AND SYSTEMS FOR RECOGNIZING HANDWRITING IN HANDWRITTEN DOCUMENTS

CROSS-REFERENCE TO RELATED APPLICATION

The present application is related to U.S. Non-Provisional application Ser. No. 14/083,573, filed Nov. 19, 2013, entitled "METHODS AND SYSTEMS FOR CREATING TASKS", the contents of which are herein incorporated by reference.

TECHNICAL FIELD

The presently disclosed embodiments are related, in general, to crowdsourcing. More particularly, the presently disclosed embodiments are related to methods and systems for comparing handwriting in two handwritten documents through crowd sourcing.

BACKGROUND

Handwriting recognition is a technique that enables a computing device to interpret handwritten text or handwritten input. A typical handwriting recognition method involves scanning a handwritten document to generate an electronic document that includes handwritten text. In the electronic document, words are identified and extracted. Further, the characters in the extracted words are identified and extracted. Thereafter, various parameters associated with the way the characters have been written are determined. The various parameters may include, but are not limited to, a percentage of pixels above the horizontal half point, a percentage of pixels to right of the vertical half point, a number of strokes, a slope associated with the extracted characters, etc.

Most of the commonly known handwriting recognition methods employ various machine-learning algorithms such as, but not limited to, neural networks and support vector machines (SVM). Such handwriting recognition methods utilize a repository of handwriting styles to recognize handwriting in the electronic document. However, recognizing handwriting using such handwriting recognition methods may be limited to the robustness of the repository (i.e., variations in handwriting styles).

SUMMARY

According to embodiments illustrated herein there is provided a method for comparing handwriting in a first electronic document and a second electronic document. The method includes extracting, by one or more processors, one or more segments from a first electronic document and a second electronic document. Each of the one or more segments includes a handwritten text. Thereafter, one or more sets of segments are created from the one or more segments by the one or more processors. An information indicating categorization of each segment in a set of segments in one or more categories is received by the one or more processors. The information is provided by one or more workers based on the handwriting in each segment. A similarity score based on a count of segments in each of the one or more categories is determined by the one or more processors. The similarity score is deterministic of a degree of similarity between the first electronic document and the second electronic document.

According to embodiments illustrated herein there is provided a system for comparing handwriting in a first electronic document and a second electronic document. The system includes one or more processors operable to extract one or more segments from the first electronic document and the second electronic document. The one or more segments include a handwritten text. Further, the one or more processors are operable to create one or more sets of segments from the one or more segments. The one or more processors are further operable to receive an information indicating categorization of each segment in a set of segments in one or more categories. The information is provided by one or more workers based on the handwriting in each segment. A similarity score is determined based on a count of segments in each of the one or more categories. The similarity score is deterministic of a degree of similarity between the first electronic document and the second electronic document.

According to embodiments illustrated herein there is provided a computer program product for use with a computing device. The computer program product comprising a non-transitory computer readable medium that stores a computer program code for comparing handwriting on one or more electronic documents. The computer program code is executable by one or more processors in the computing device to extract one or more segments from a first electronic document and a second electronic document. The one or more segments include a handwritten text. Further, the computer program code is executable by the one or more processors to create one or more sets of segments from the one or more segments. an information indicating categorization of each segment in a set of segments in one or more categories is received by the one or more processors. The information is provided by one or more workers based on the handwriting in each segment. The computer program code is further executable by the one or more processors to determine a similarity score based on a count of segments in each of the one or more categories. The similarity score is deterministic of a degree of similarity between the first electronic document and the second electronic document.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

A "task" refers to a piece of work, an activity, an action, a job, an instruction, or an assignment to be performed. Tasks may necessitate the involvement of one or more workers. Examples of tasks include, but are not limited to, digitization of a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but not limited to, Amazon Mechanical Turk and Crowd Flower.

A "crowdsourcing platform" refers to a business application, wherein a broad, loosely defined external group of people, communities, or organizations provides solutions as outputs for any specific business processes received by the application as input. In an embodiment, the business application may be hosted online on a web portal (e.g., crowdsourcing platform servers). Various examples of the crowdsourcing platforms include, but are not limited to, Amazon Mechanical Turk or Crowd Flower.

A "crowdworker" refers to a workforce/worker(s) that may perform one or more tasks, which generate data that contributes to a defined result. According to the present disclosure, the crowdworker(s) includes, but is not limited to, a satellite center employee, a rural business process outsourcing (BPO) firm employee, a home-based employee, or an internet-based employee. Hereinafter, the terms "crowdworker", "worker", "remote worker", "crowdsourced workforce", and "crowd" may be interchangeably used.

"Handwriting" refers to a writing done with a pen or pencil or any other writing tool used by a person. In an embodiment, the handwriting also corresponds to a style or a manner of writing by hand. Handwriting may characterize a particular person's way of writing.

An "electronic document" refers to a collection of data, including image data, in any format, retained in an electronic form. The electronic document can contain one or more handwritten texts, symbols, or the like. In an embodiment, the electronic document is obtained by scanning a corresponding physical document including, but not limited to, a handwritten document. The electronic document can be stored in various file formats, such as JPG or JPEG, GIF, TIFF, PNG, BMP, RAW, PSD, PSP, PDF, and the like. Various examples of the electronic document include, but are not limited to, any application form, such as an employment form, a medical insurance claim form, a driving license application, and the like.

A "degree of similarity" refers to a measure of similarity in handwriting in a first electronic document and a second electronic document. In an embodiment, the measure of similarity is represented by a similarity score.

A "color characteristic associated with a document" refers to a measure of color in an electronic document. In an embodiment, the color characteristics include the measure of one or more of color and hue.

A "reliability score" refers to a measure of confidence in a response received from a crowdworker. In an embodiment, the reliability score may be deterministic of whether the response received from the crowdworker is legitimate or not.

Figure 1:
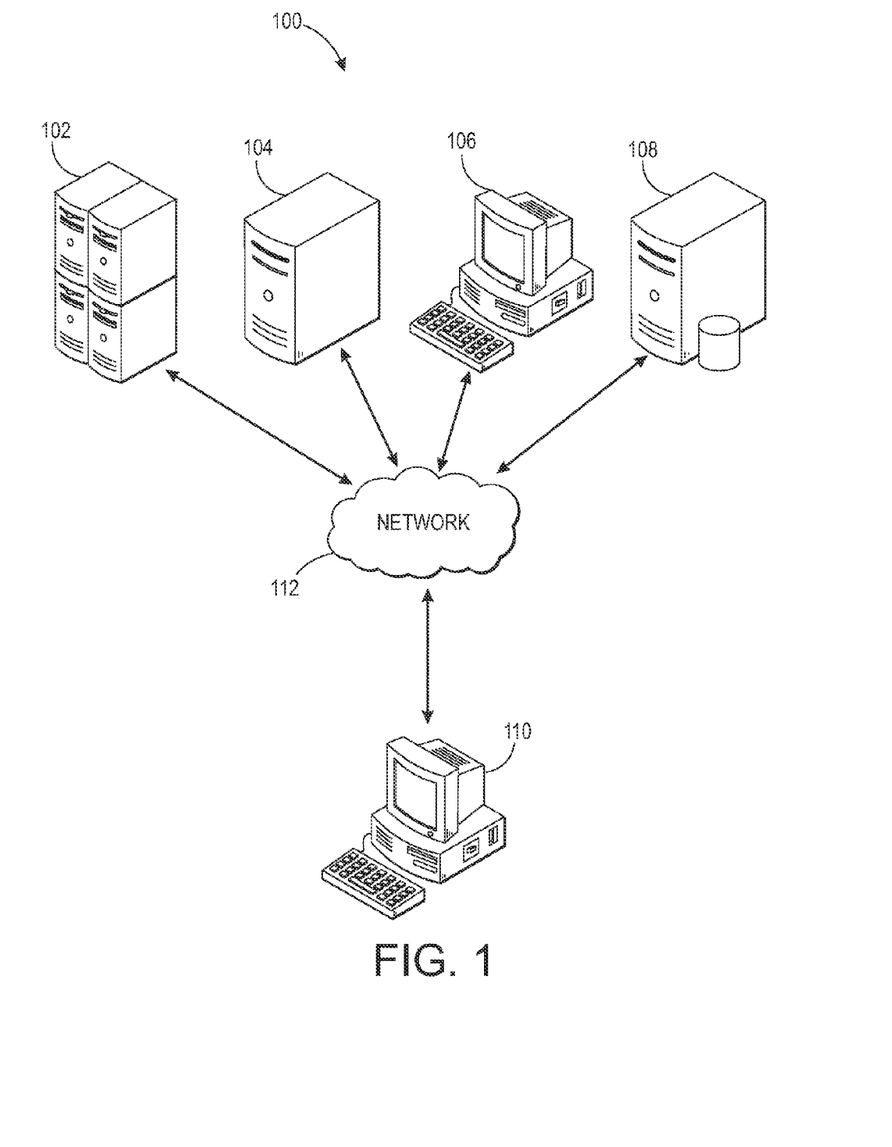
FIG. 1 is a block diagram illustrating a system environment in which various embodiments can be implemented.

FIG. 1 is a block diagram illustrating a system environment 100 in which various embodiments can be implemented. The system environment 100 includes a crowdsourcing platform server 102, an application server 104, a requestor computing device 106, a database server 108, a crowdworker computing device 110, and a network 112.

The crowdsourcing platform server 102 is operable to host one or more crowdsourcing platforms. One or more crowdworkers are registered with the one or more crowdsourcing platforms. A crowdsourcing platform offers one or more tasks to the one or more crowdworkers. In an embodiment, the crowdsourcing platform presents a user interface to the one or more crowdworkers through a web-based interface or a client application. The one or more crowdworkers may access the one or more tasks through the web-based interface or the client application. Further, the one or more crowdworkers may submit a response to the crowdsourcing platform through the user interface. In an embodiment, the crowdsourcing platform server 102 may be realized through an application server, including, but not limited to, Java application server, .NET framework, and Base4 application server.

The application server 104 is operable to generate the one or more tasks from one or more electronic documents received from the requestor computing device 106. In an embodiment, each of the one or more electronic documents includes handwritten text. Further, the application server 104 uploads the one or more generated tasks on the crowdsourcing platform. In an embodiment, the application server 104 receives responses for the one or more uploaded tasks from the one or more crowdworkers through the crowdsourcing platform. The application server 104 may validate the responses and accordingly cluster the one or more electronic documents in one or more clusters. The clustering of the one or more electronic documents has been described later in conjunction with FIG. 4A, FIG. 4B and FIG. 5. Some examples of the application server 104 may include, but are not limited to, Java application server, .NET framework, and Base4 application server.

A person having ordinary skills in the art would understand that the scope of the disclosure is not limited to illustrating the application server 104 as a separate entity. In an embodiment, the functionality of the application server 104 may be implementable on/integrated with the crowdsourcing platform server 102.

The requestor computing device 106 is a computing device used by a requestor. In an embodiment, the requestor computing device 106 has one or more handwritten documents. The requestor computing device 106 may scan each of the one or more handwritten documents to generate the one or more electronic documents. In an embodiment, the requestor computing device 106 may employ an image capturing device such as a scanner or a camera to scan the one or more handwritten documents. Thereafter, the requestor uploads the one or more electronic documents on the application server 104. Examples of the requestor computing device 106 include, but are not limited to, a personal computer, a laptop, a personal digital assistant (PDA), a mobile device, a tablet, or any other computing device.

The database server 108 stores information pertaining to the one or more crowdworkers. Further, the database server 108 stores information associated with the one or more uploaded tasks and the one or more electronic documents. In an embodiment, the database server 108 may receive a query from at least one of the crowdsourcing platform server 102 or the application server 104 to extract information associated with the one or more crowdworkers, the one or more uploaded tasks, or the one or more electronic documents. The database server 108 may be realized through various technologies, including, but not limited to, Microsoft® SQL server, Oracle, and My SQL. In an embodiment, the crowdsourcing platform server 102 and/or the application server 104 may connect to the database server 108 using one or more protocols such as, but not limited to, the ODBC protocol and the JDBC protocol.

A person having ordinary skills in the art would understand that the scope of the disclosure is not limited to the database server 108 as a separate entity. In an embodiment, the functionalities of the database server 108 can be integrated into the crowdsourcing platform server 102 and/or the application server 104.

The crowdworker computing device 110 is a computing device used by a crowdworker. The crowdworker computing device 110 is operable to present the user interface (received from the crowdsourcing platform) to the crowdworker. The crowdworker receives the one or more tasks from the crowdsourcing platform through the user interface. Thereafter, the crowdworker submits the response through the user interface to the crowdsourcing platform. Some examples of the crowdworker computing device 110 include a personal computer, a laptop, a PDA, a mobile device including a mobile phone, a smartphone, a tablet, or any device that has the capability to display the user interface.

The network 112 corresponds to a medium through which content and messages flow between various devices of the system environment 100 (e.g., the crowdsourcing platform server 102, the application server 104, the requestor computing device 106, the database server 108, and the crowdworker computing device 110). Examples of the network 112 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 112 in accordance with various wired and wireless communication protocols such as Transmission Control Protocol and Internet Protocol (TCP/IP), User Datagram Protocol (UDP), and 2G, 3G, or 4G communication protocols.

Figure 2:
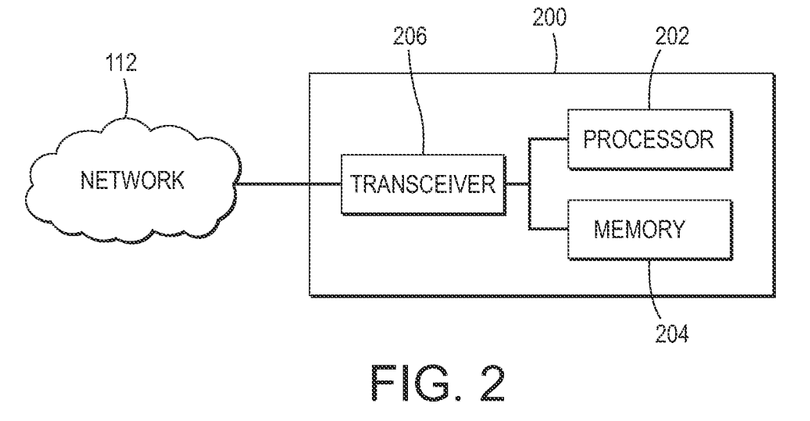
FIG. 2 is a block diagram of a system for comparing electronic documents based on handwriting, in accordance with at least one embodiment.

FIG. 2 is a block diagram illustrating a system 200 for comparing electronic documents based on handwriting, in accordance with at least one embodiment. The system 200 includes a processor 202, a memory 204, and a transceiver 206. The processor 202 is coupled to the memory 204 and the transceiver 206. The transceiver 206 is connected to the network 112. In an embodiment, the system 200 may correspond to the application server 104. However, a person skilled in the art would appreciate that the system 200 may be implemented as the crowdsourcing platform server 102 or the requestor computing device 106. For the sake of brevity, the system 200 has been considered as the application server 104.

The processor 202 includes suitable logic, circuitry, and/or interfaces that are operable to execute one or more instructions stored in the memory 204 to perform predetermined operations. The memory 204 may be operable to store the one or more instructions. The processor 202 may be implemented using one or more processor technologies known in the art. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person having ordinary skills in the art that the one or more instructions stored in the memory 204 enable the hardware of the system 200 to perform the predetermined operations.

The transceiver 206 transmits and receives messages and data to/from various components of the system environment 100 (e.g., the crowdsourcing platform server 102, the requestor computing device 106, the database server 108, and the crowdworker computing device 110) over the network 112. Examples of the transceiver 206 may include, but are not limited to, an antenna, an Ethernet port, a USB port, or any other port that can be configured to receive and transmit data. The transceiver 206 transmits and receives data/messages in accordance with the various communication protocols, such as TCP/IP, UDP, and 2G, 3G, or 4G.

Figure 3:
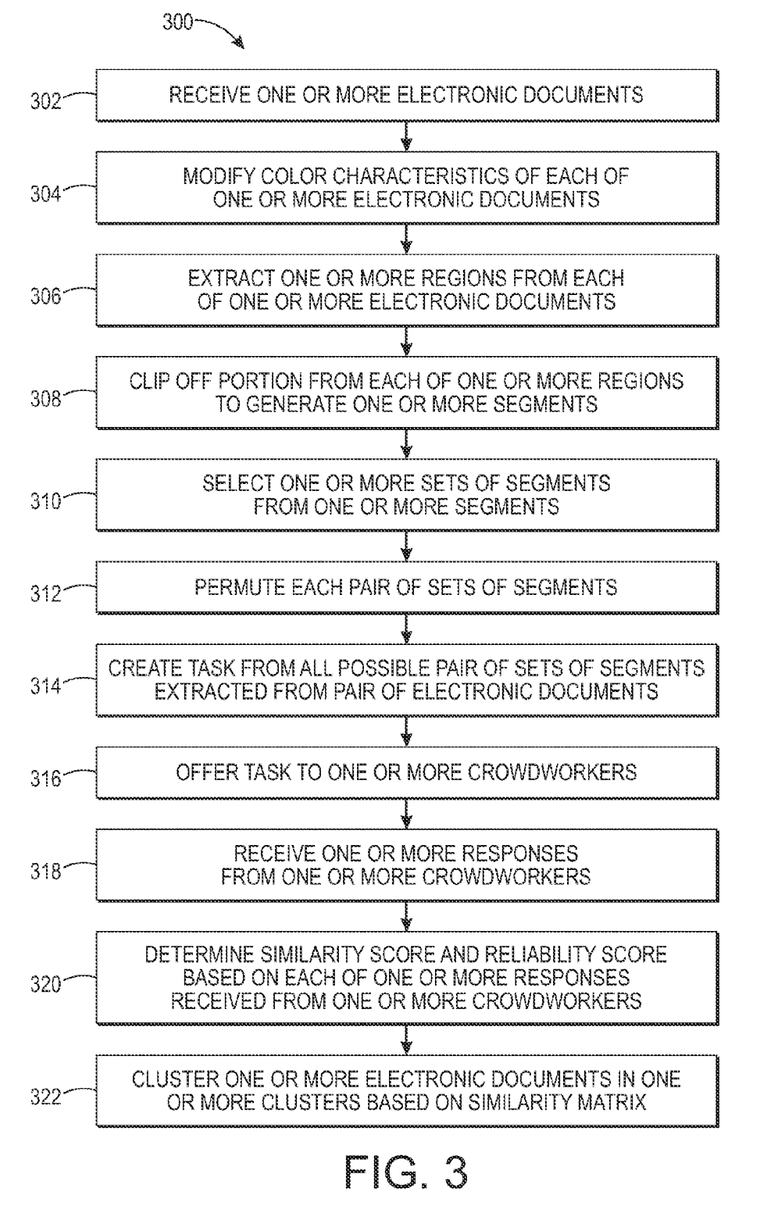
FIG. 3 is a flowchart illustrating a method for clustering one or more electronic documents, in accordance with at least one embodiment.

The operation of the system 200 for clustering one or more electronic documents based on the handwriting has been described in conjunction with FIG. 3.

FIG. 3 is a flowchart 300 illustrating a method for clustering one or more electronic documents, in accordance with at least one embodiment. The flowchart 300 is described in conjunction with FIG. 2.

At step 302, the one or more electronic documents are received. In an embodiment, the processor 202 receives the one or more electronic documents through the transceiver 206. Prior to receiving the one or more electronic documents, the requestor computing device 106 scans the one or more handwritten documents to generate the one or more electronic documents. In an embodiment, the requestor computing device 106 may employ any known image capturing device, such as a scanner or a camera, to scan and generate the one or more electronic documents. Each of the one or more electronic documents includes handwritten text. Thereafter, the requestor computing device 106 uploads the one or more electronic documents on the application server 104.

At step 304, one or more color characteristics associated with each of the one or more electronic documents are modified. In an embodiment, the processor 202 is operable to modify the one or more color characteristics. Modifying the one or more color characteristics involves modifying the color scheme of the one or more electronic documents to grayscale by varying the chroma value of the pixels in each of the one or more electronic documents.

At step 306, one or more regions are extracted from each of the one or more electronic documents. In an embodiment, the processor 202 is operable to extract the one or more regions. In an embodiment, the one or more regions include handwritten text having at least one word.

In order to obtain the one or more regions, the processor 202 divides each of the one or more electronic documents in one or more vertical zones. Thereafter, the processor 202 identifies textual zones in each of the vertical zones. For each textual zone in each vertical zone, the processor 202 employs a Hidden Markov model to identify text portions and gap portions within the handwritten text. In an embodiment, the gap portions correspond to a gap between two adjacent words. Based on the gap portions and the text portions, the processor 202 draws a text-line separator in each of the one or more electronic documents. Thereafter, the processor 202 employs a support vector machine (SVM) to determine a gap metric between the two adjacent words (encompassed by the text-line separator). The processor 202 compares the determined gap metric with a threshold value. If the processor 202 determines that the gap metric is greater than the threshold, the two adjacent words are considered as two different words and are considered as two regions. If the processor 202 determines that the gap metric is less than the threshold, the two adjacent words are considered as a single word and hence a single region.

A person having ordinary skills in the art would understand that the scope of the disclosure should not be limited to obtaining the one or more regions based on the above mentioned method. In an embodiment, the processor 202 may employ various other known image processing techniques to extract the one or more regions from each of the one or more electronic documents.

At step 308, a predetermined portion is clipped off from the one or more regions to generate the one or more segments. Prior to clipping off the one or more regions, the processor 202 may select a set of regions from the one or more regions based on the sensitivity of the word encompassed in the region. For example, if the word encompassed by a region discloses certain information about the electronic document, the region is discarded. Only those regions are selected that do not disclose any sensitive information pertaining to the electronic document. Post the selection of the set of regions, the processor 202 clips off the predetermined portion from each region in the set of regions to generate the one or more segments. In an embodiment, the processor 202 clips off 20% of the total area of the each region.

The processor 202 assigns a document identifier to each of the one or more segments. In an embodiment, the document identifier is representative of the electronic document from which the one or more segments have been extracted by the processor 202. Further, the processor 202 stores the document identifier in the database server 108. In an embodiment, the document identifier may be embedded in the one or more segments as a watermark.

At step 310, one or more sets of segments are selected from the one or more segments (extracted from an electronic document). In an embodiment, the processor 202 selects the one or more sets of segments from the one or more segments. For example, the one or more segments extracted from a first electronic document include 'm' segments. The processor 202 is operable to randomly select 'l' segments from the 'm' segments (where 'l'<'m'). The operation of randomly selecting 'l' segments is performed 'k' times for redundancy purposes. Therefore, total of 'k*l' sets of segments are created from the 'm' segments.

$$\text{Total sets of segments} = k*l \qquad (1)$$

Thereafter, the processor 202 creates a queue that includes all possible pairs of 'k*l' sets of segments. A number of all possible pairs of 'k*l' sets of segments can be determined using following equation:

$$\text{Number of all possible pairs of sets of segments} = \frac{kl*(kl-1)}{2} \qquad (2)$$

At step 312, each pair of sets of segments is permuted. In an embodiment, the processor 202 permutes each pair of sets of segments. In an embodiment, the processor 202 also permutes segments in each pair of sets of segments. In an embodiment, the processor 202 creates such queues for each of the one or more electronic documents.

At step 314, a task is created from the queues obtained from a pair of electronic documents (for example, the first electronic document and a second electronic document). In an embodiment, the processor 202 is operable to create the task. The task includes all possible pair of sets of segments obtained from the first electronic document and the second electronic document (as described in steps 310 and 312). Further, the task includes an instruction for the crowdworker to categorize the segments from the two electronic documents in three categories. The first category would include the segments that may correspond to the first electronic document. The second category would include the segments that correspond to the second electronic document. The third category would include segments about which the crowdworker may not be sure about whether the segment corresponds to the first electronic document or the second electronic document. The creation of the task that includes the sets of segments from two electronic documents has been described in conjunction with FIG. 4A and FIG. 4B.

At step 316, the task is offered to the one or more crowdworkers. In an embodiment, the processor 202 offers the task to the one or more crowdworkers. The processor 202 may upload the task on the crowdsourcing platform. In a scenario where the application server 104 is implemented in the crowdsourcing platform server 102, the processor 202 may directly offer the task to the one or more crowdworkers through the user interface being presented to each crowdworker on the crowdworker computing device 110. A crowdworker may accept to perform the task. As per the instructions in the task, the crowdworker may categorize the segments from the two electronic documents in the three categories. In an embodiment, the task is offered to more than one crowdworker for redundancy purposes.

The crowdworker, while attempting the task, analyzes the segments being displayed from the two electronic documents. The crowdworker may not have an idea about whether a segment corresponds to the first electronic document or the second electronic document. Based on the handwriting of the handwritten text in the segments, the crowdworker determines whether any two segments belong to same electronic document or different electronic document. For example, the crowdworker analyzes a first segment and a second segment. For instance, the first segment has been extracted from the first electronic document and the second segment has been extracted from the second electronic document. Based on the handwriting, the crowdworker may believe that both segments correspond to same electronic document. Therefore, the crowdworker may categorize them in the first category. Similarly, the crowdworker may categorize some of the segments in the second category, where the crowdworker may believe that the segments correspond to the second electronic document. Crowdworker may be confused about few segments that whether the segments correspond to the first electronic document or the second electronic document. Such segments are categorized by the crowdworker in the third category. Post the categorization of the segments, the crowdworker sends the response to the crowdsourcing platform server 102.

At step 318, one or more responses for the task are received from the one or more crowdworkers. In an embodiment, the processor 202 receives the one or more responses through the crowdsourcing platform via the transceiver 206. Each of the one or more responses includes information corresponding to the categorization of all possible pair of sets of segments (obtained from the first electronic document and the second electronic document) in the three categories. In an embodiment, the processor 202 stores the one or more responses in the database server 108.

At step 320, a similarity score and a reliability score are determined based on each of the one or more responses received from the one or more crowdworkers for the task. In an embodiment, the processor 202 is operable to determine the similarity score and the reliability score. Prior to determining the reliability score and the similarity score, the processor 202 extracts the one or more responses from the database server 108. In addition, the processor 202 extracts the document identifiers corresponding to the pair of electronic documents from the database server 108. The processor 202 compares the document identifiers with the watermark on each of the one or more segments to determine whether a segment corresponds to the first electronic document or the second electronic document.

Based on the information in a response from the one or more responses, the processor 202 determines the categorization of the segments in one of the three categories. For each segment in each category, the processor 202 determines whether a segment in a category corresponds to the first electronic document or the second electronic document based on the comparison of the document identifier with the watermark on the segment. Further, the processor 202 determines a count of segments that corresponds to the first electronic document and the second electronic document, in each category. Based on the count of segments in the three categories, the processor 202 determines the similarity score between the first electronic document and the second electronic document. In an embodiment, the processor 202 utilizes following equation to determine the similarity score:

$$\text{Similarity score: } \frac{2a_1 a_2}{(a_1 + a_2)^2} + \frac{2b_1 b_2}{(b_1 + b_2)^2} \quad (3)$$

where, $a_1$: Count of segments in the first category, where the segments correspond to the first electronic document;

$a_2$: Count of segments in the first category, where the segments correspond to the second electronic document;

$b_1$: Count of segments in the second category, where the segments correspond to the first electronic document; and $b_2$: Count of segments in the second category, where the segments correspond to the second electronic document.

As discussed, the reliability score is indicative of whether the response received from a crowdworker is reliable enough to be considered. In an embodiment, the reliability score is inversely proportional to a number of segments categorized in the third category (i.e., segments about which the crowdworker was not sure about whether the segment corresponds to the first electronic document or the second electronic document). In an embodiment, the processor 202 uses the following equation to determine the reliability score:

$$\text{Reliability Score: } \frac{1}{c+1} \quad (4)$$

where, c: Count of segments categorized in the third category.

In an embodiment, the processor 202 is operable to determine the reliability score for each of the one or more responses received for the task.

Thereafter, the processor 202 collates the similarity scores determined based on the information in each of the one or more responses to determine a final similarity score. In an embodiment, the processor 202 determines the final similarity score based on the weighted sum of the similarity scores, the reputation of the crowdworker associated with the each of the one or more responses, and the reliability score associated with each of the one or more responses (determined using equation 4).

The processor 202 performs the step 320 for each pair of electronic documents to determine the final similarity score for each pair of electronic documents. Thereafter, the processor 202 constructs a similarity matrix based on the final similarity scores of each pair of electronic documents. The similarity matrix has been described in conjunction with FIG. 5.

At step 322, the processor 202 clusters the one or more electronic documents in the one or more clusters based on the similarity matrix. The clustering of the one or more documents has been described in conjunction with FIG. 5.

Figure 4A:
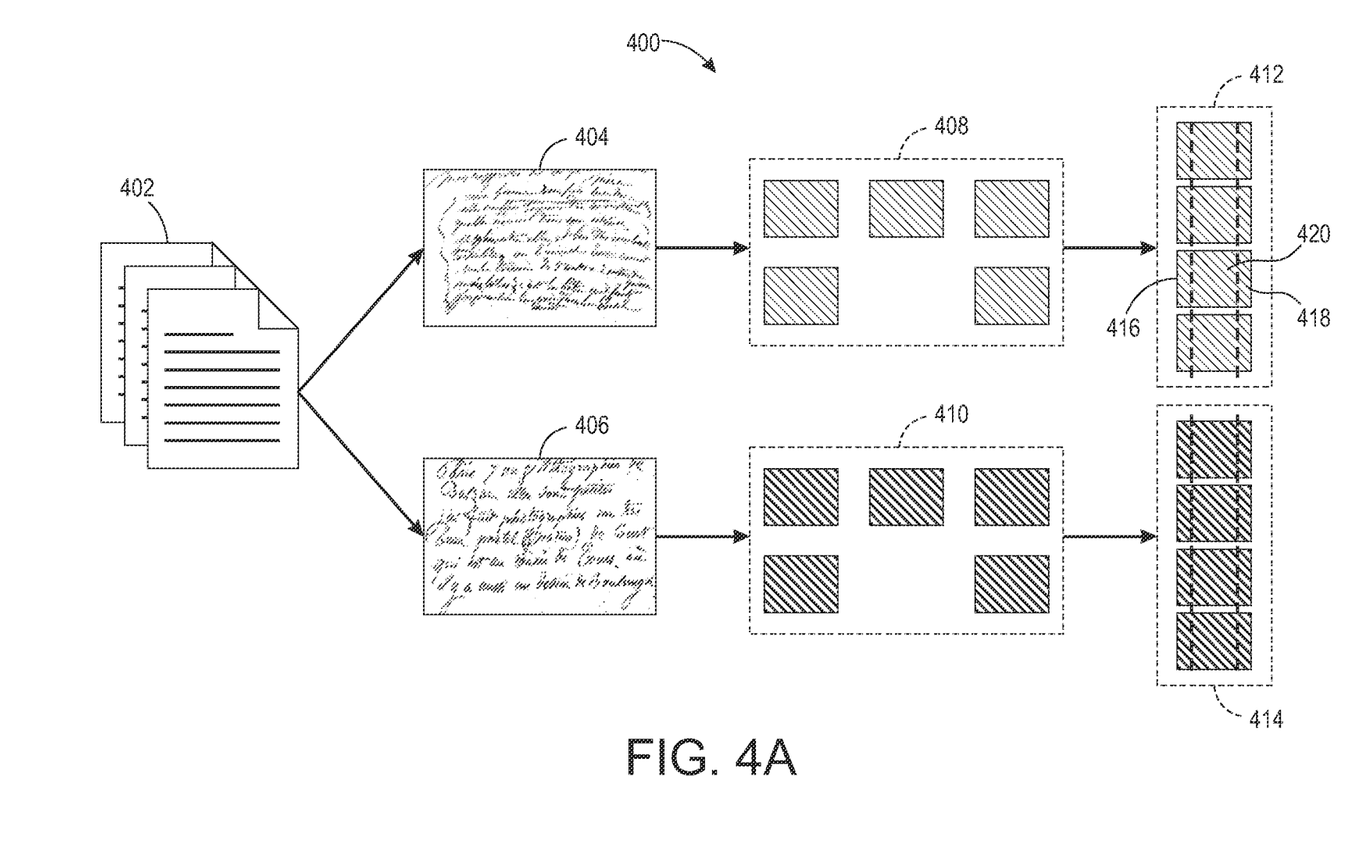
FIG. 4A and FIG. 4B correspond to a process flow diagram illustrating a process of creating a task from the one or more electronic documents, in accordance with at least one embodiment.
Figure 4B:
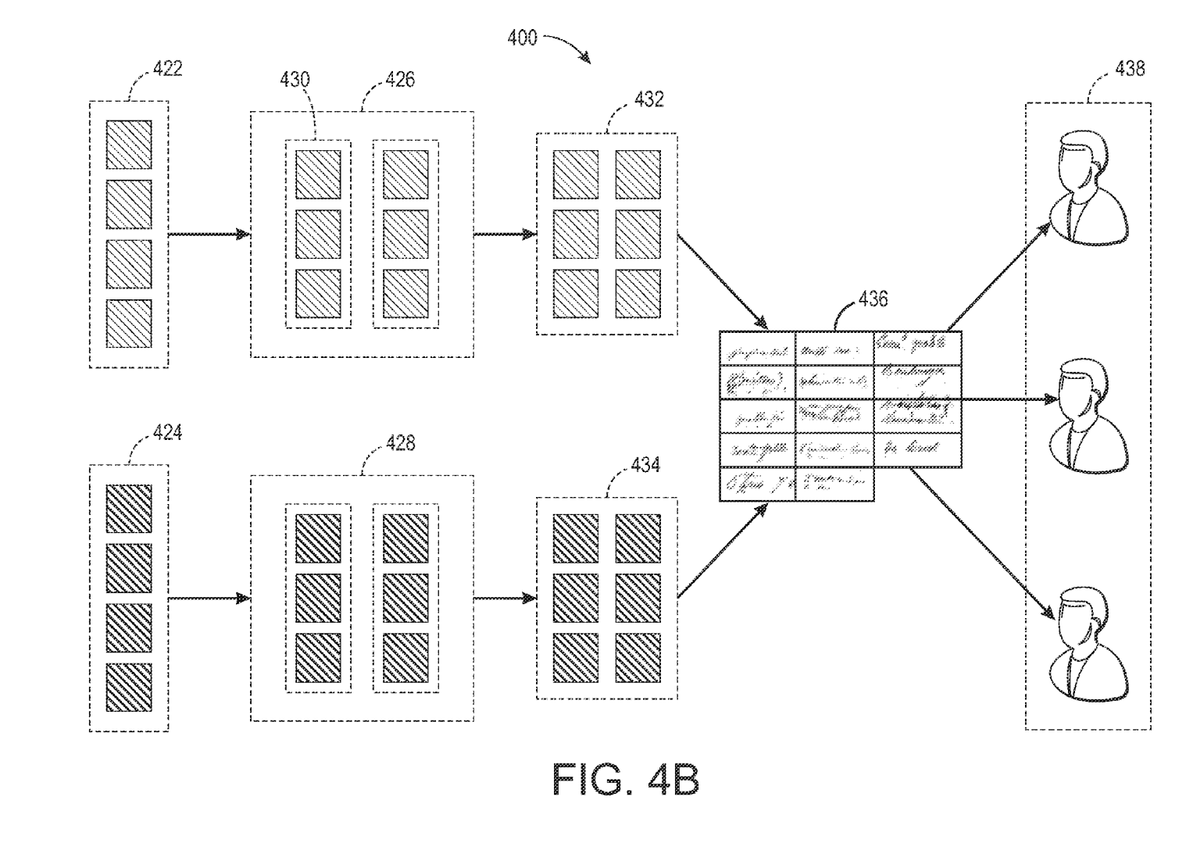

FIG. 4A and FIG. 4B correspond to a process flow diagram 400 illustrating a process of creating a task from the one or more electronic documents, in accordance with an embodiment. The process flow diagram 400 is described in conjunction with FIG. 1, FIG. 2, and FIG. 3.

The processor 202 receives the one or more electronic documents 402 from the requestor computing device 106. For each of the one or more electronic documents 402, the processor 202 extracts the one or more regions (as described in step 306). For example, the one or more regions (collectively depicted by 408) are extracted from the first electronic document 404. Similarly, the one or more regions (collectively depicted by 410) are extracted from the second electronic document 406. The ongoing description has been described in light of the first electronic document 404 and the second electronic document 406. However, the scope of the disclosure should not be limited to processing of two electronic documents. As described above in conjunction with FIG. 3, the method is applicable to each of the one or more electronic documents 402.

Post the extraction of the one or more regions, the processor 202 creates one or more segments by clipping off the predetermined portion from the one or more regions (as described in the step 308). Prior to generation of the one or more segments, a set of regions is selected from the one or more regions based on the sensitivity of the words encompassed by the regions. From the first electronic document 404 and the second electronic document 406, the clipping-off of the selected set of regions is collectively depicted by the 412 and 414, respectively. Further as depicted, portion 418 has been clipped off from the region 416. The left over portion 420 is the segment. The same process is repeated for each region in the set of regions to generate the one or more segments from the first electronic document 404 (depicted by 422) and the one or more segments from the second electronic document 406 (depicted by 424).

From these one or more segments, the processor 202 selects the sets of segments as described in step 310. For example, three segments are randomly selected two times from a set of segments (number of segments in the set of segments is 4). The sets of segments generated from the first electronic document 404 and the second electronic document 406, are depicted by 426 and 428, respectively (for example, 430 corresponds to a set of segments). Thereafter, the processor 202 generates all possible pairs of the sets of segments extracted from the first electronic document 404 and the second electronic document 406 (depicted by 432 and 434, respectively). An example pair of set of segments is depicted by 432.

All such possible pair of sets of segments from the first electronic document 404 and the second electronic document 406 are combined together to generate a task (depicted by 436). The task is presented to the one or more crowdworkers (depicted by 438).

Figure 5:
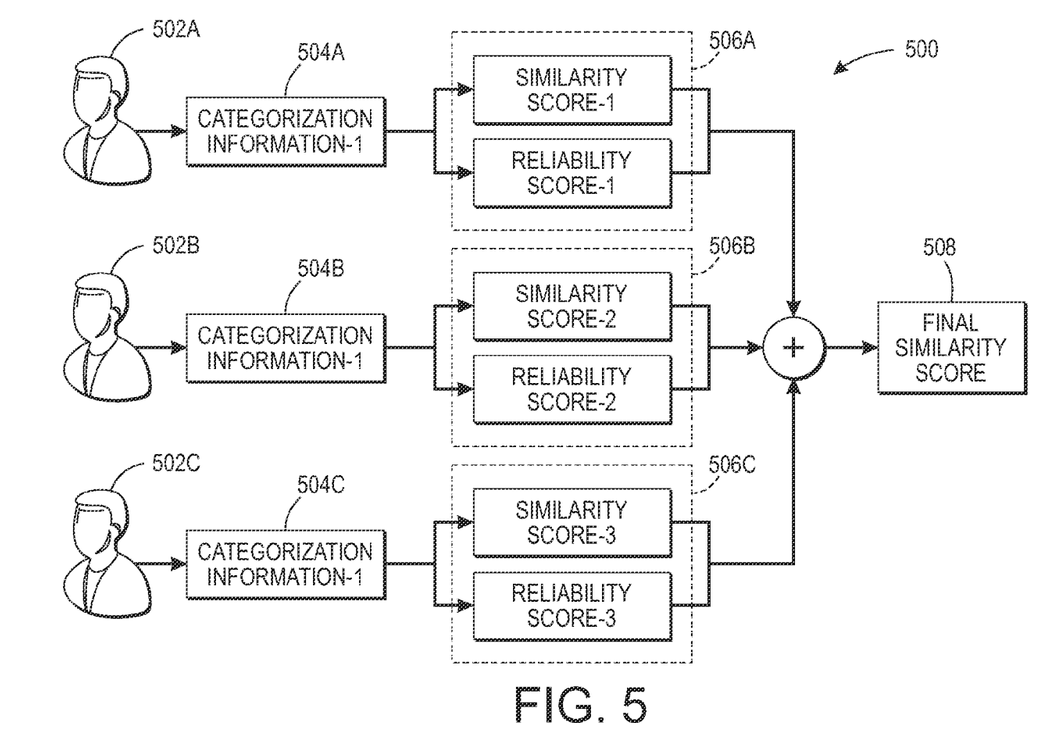
FIG. 5 is another process flow diagram illustrating a process of clustering the one or more electronic documents, in accordance with at least one embodiment.

FIG. 5 is another process flow diagram 500 illustrating a process of clustering the one or more electronic documents 402. The process flow diagram 500 is described in conjunction with FIG. 1, FIG. 2, FIG. 3, FIG. 4A and FIG. 4B.

The one or more responses are received from the one or more crowdworkers (for example, crowdworker 502A). Each of the one or more responses includes information pertaining to the categorization of the segments from the first electronic document 404 and the second electronic document 406 (for example, the categorization information-1 504A). Based on the categorization information obtained from each of the one or more responses, the similarity score and the reliability score are determined (depicted by 506A). Thereafter, the similarity score determined for each of the one or more responses are collated based on the reliability score to generate a final similarity score (depicted by 508) for the first electronic document 404 and the second electronic document 406. Such final similarity score is determined for each of the one or more pair of electronic documents 402 to create a similarity matrix. An example similarity matrix is depicted as follows:

TABLE 1

An example similarity matrix

| Rows/Columns | Electronic Document-1 | Electronic Document-2 | Electronic Document-3 | Electronic Document-4 |
|---|---|---|---|---|
| Electronic Document-1 | 100% | 50% | 30% | 80% |
| Electronic Document-2 | 50% | 100% | 60% | 20% |
| Electronic Document-3 | 30% | 60% | 100% | 40% |
| Electronic Document-4 | 80% | 20% | 40% | 100% |

From the similarity matrix, it can be observed that the degree of similarity between the electronic document-1 and electronic document-2 is 50%. Similarly, the degree of similarity between the electronic document-1 and electronic document-4 is 80%.

Based on the similarity matrix, the one or more electronic documents 402 are clustered in the one or more clusters. For example, as per the similarity matrix disclosed in Table 1, it can be observed that the electronic document-1 is similar to the electronic document-4. Further, it can be observed that the electronic document-2 is similar to the electronic document-3. Hence, two clusters are created; the first cluster includes the electronic document-1 and the electronic document-4. The second cluster includes the electronic document-2 and the electronic document-3.

A person having ordinary skills in the art would understand that the scope of the disclosure should not be limited to clustering the one or more electronic documents based on the method described above. In an embodiment, the one or more electronic documents may be clustered using any other known technique based on the final similarity score.

The disclosed embodiments encompass numerous advantages. Crowdsourcing the task of handwriting recognition to the one or more crowdworkers brings in a human angle to the comparisons of the one or more documents based on the handwriting. Hence, determination of whether two documents are same becomes more efficient.

When the one or more regions are extracted from the one or more electronic documents, the predetermined portion from the one or more regions is clipped-off. Thus, only a portion of the word is sent to the crowdworker. Therefore, the information in an electronic document is not disclosed to the crowdworker. Further, since the color information of the one or more electronic documents is modified, the crowdworker cannot obtain information pertaining to the electronic document based on the color information of the document.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, optical-disk drive, and the like. The storage device may also be a means for loading computer programs or other instructions onto the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through the I/O interface.

To process input data, the computer system executes a set of instructions that is stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages, including but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for recognizing handwriting in handwritten documents have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person having ordinary skills in the art will appreciate that the systems, modules, and sub-modules have been illustrated and explained to serve as examples and should not be considered limiting in any manner. It will be further appreciated that the variants of the above disclosed system elements, modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, and the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for comparing handwriting, the method comprising:
   modifying, by one or more processors, one or more color characteristics associated with each of a first electronic document and a second electronic document;
   extracting, by the one or more processors, one or more segments from the modified first electronic document and the modified second electronic document, wherein each of the one or more segments include a handwritten text;
   creating, by the one or more processors, one or more sets of segments from the one or more segments;
   receiving, by the one or more processors, an information indicating categorization of each segment in a set of segments in one or more categories, wherein the information is provided by one or more crowdworkers based on the handwriting in each segment; and
   determining, by the one or more processors, a similarity score based on a count of segments in each of the one or more categories, wherein the similarity score is deterministic of a degree of similarity between the modified first electronic document and the modified second electronic document.

2. The method of claim 1 further comprising extracting, by the one or more processors, one or more regions from each of the modified first electronic document and the modified second electronic document, wherein each of the one or more regions comprises one or more words.

3. The method of claim 2 further comprising clipping off, by the one or more processors, a portion from each of the one or more regions to generate the one or more segments.

4. The method of claim 1 further comprising permuting, by the one or more processors, the one or more segments from each of the modified first electronic document and the modified second electronic document.

5. The method of claim 1, wherein the set of segments includes a first predetermined number of segments from the modified first electronic document and a second predetermined number of segments from the modified second electronic document.

6. The method of claim 1 further comprising determining, by the one or more processors, a reliability score based on the count of segments in each of the one or more categories, wherein the reliability score is deterministic of quality of the categorization.

7. The method of claim 1 further comprising digitizing, by the one or more processors, a first handwritten document and a second handwritten document to generate the first electronic document and the second electronic document, respectively.

8. A method for clustering one or more electronic documents, the method comprising:
   modifying, by one or more processors, one or more color characteristics associated with the one or more electronic documents;
   extracting, by the one or more processors, one or more segments from each of the modified one or more electronic documents, wherein the one or more segments include a handwritten text;
   for each pair of modified electronic documents from the modified one or more electronic documents:
   creating one or more sets of segments from the one or more segments extracted from the pair of modified electronic documents;
   receiving, by the one or more processors, an information indicating categorization of each segment in a set of segments in one or more categories, wherein the information is provided by one or more crowdworkers based on the handwriting in each segment;

determining, by the one or more processors, a similarity score based on a count of segments in each of the one or more categories; and determining, by the one or more processors, a similarity matrix based on the similarity score; and clustering, by the one or more processors, the modified one or more electronic documents in one or more clusters based on the similarity matrix.

9. The method of claim 8 further comprising extracting, by the one or more processors, one or more regions from each of the modified one or more electronic documents, wherein each of the one or more regions comprises one or more words.

10. The method of claim 9 further comprising clipping off, by the one or more processors, a portion from each of the one or more regions to generate the one or more segments.

11. The method of claim 8 further comprising offering a task to the one or more crowdworkers, wherein the task corresponds to the categorization of the each segment in the set of segments.

12. The method of claim 8 further comprising digitizing, by the one or more processors, one or more handwritten documents to generate the one or more electronic documents.

13. A system for comparing handwriting, the system comprising:

one or more processors operable to:

modify, one or more color characteristics associated with each of a first electronic document and a second electronic document;

extract one or more segments from the modified first electronic document and the modified second electronic document, wherein the one or more segments include a handwritten text;

create one or more sets of segments from the one or more segments;

receive an information indicating categorization of each segment in a set of segments in one or more categories, wherein the information is provided by one or more crowdworkers based on the handwriting in each segment; and determine a similarity score based on a count of segments in each of the one or more categories, wherein the similarity score is deterministic of a degree of similarity between the modified first electronic document and the modified second electronic document.

14. The system of claim 13, wherein the one or more processors are further operable to extract one or more regions from each of the modified first electronic document and the modified second electronic document, wherein each of the one or more regions comprises one or more words.

15. The system of claim 14, wherein the one or more processors are further operable to clip off a portion from each of the one or more regions to generate the one or more segments.

16. The system of claim 13, wherein the one or more processors are further operable to permute the one or more segments from each of the modified first electronic document and the modified second electronic document.

17. The system of claim 13, wherein the set of segments includes a first predetermined number of segments from the modified first electronic document and a second predetermined number of segments from the modified second electronic document.

18. The system of claim 13, wherein the one or more processors are further operable to digitize a first handwritten document and a second handwritten document to generate the first electronic document and the second electronic document, respectively.

19. A system for clustering one or more electronic documents, the system comprising:

one or more processors operable to:

modify, one or more color characteristics associated with the one or more electronic documents;

extract one or more segments from each of the one or more modified electronic documents, wherein the one or more segments include a handwritten text;

for each pair of modified electronic documents from the one or more modified electronic documents:

create one or more sets of segments from the one or more segments extracted from the pair of modified electronic documents;

receive information indicating categorization of each segment in a set of segments in one or more categories, wherein the information is provided by one or more crowdworkers based on the handwriting in each segment;

determine a similarity score based on a count of segments in each of the one or more categories; and a similarity matrix based on the similarity score; and cluster the one or more modified electronic documents in one or more clusters based on the similarity matrix.

20. The system of claim 19, wherein the one or more processors are further operable to digitize one or more handwritten documents to generate the one or more electronic documents.

21. A computer program product for use with a computing device, the computer program product comprising a non-transitory computer readable medium, the non-transitory computer readable medium stores a computer program code for comparing handwriting on one or more electronic documents, the computer program code is executable by one or more processors in the computing device to:

modify, one or more color characteristics associated with each of a first electronic document and a second electronic document;

extract one or more segments from the modified first electronic document and the modified second electronic document, wherein the one or more segments include a handwritten text;

create one or more sets of segments from the one or more segments;

receive an information indicating categorization of each segment in a set of segments in one or more categories, wherein the information is provided by one or more crowdworkers based on the handwriting in each segment; and determine a similarity score based on a count of segments in each of the one or more categories, wherein the similarity score is deterministic of a degree of similarity between the modified first electronic document and the modified second electronic document.

* * * * *